April 5, 1938. C. R. PATON 2,113,094
MOTOR VEHICLE
Filed Dec. 7, 1933 5 Sheets-Sheet 3
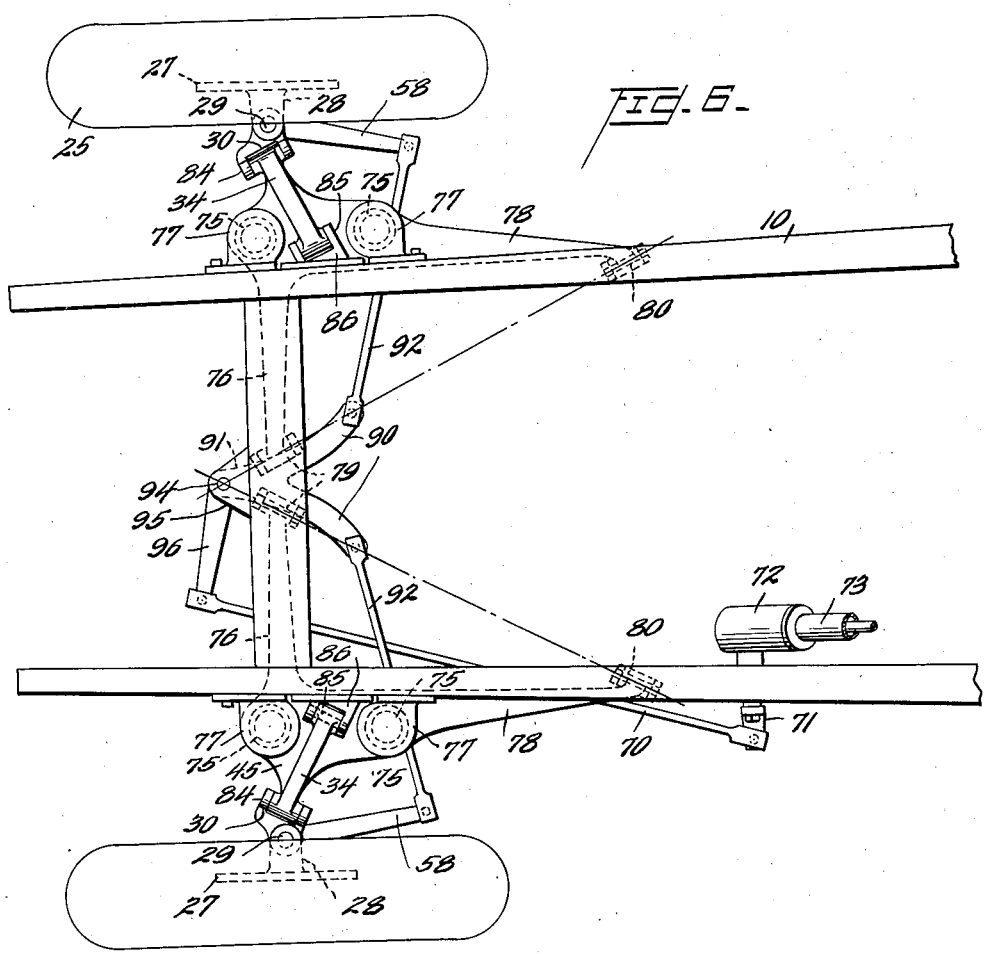
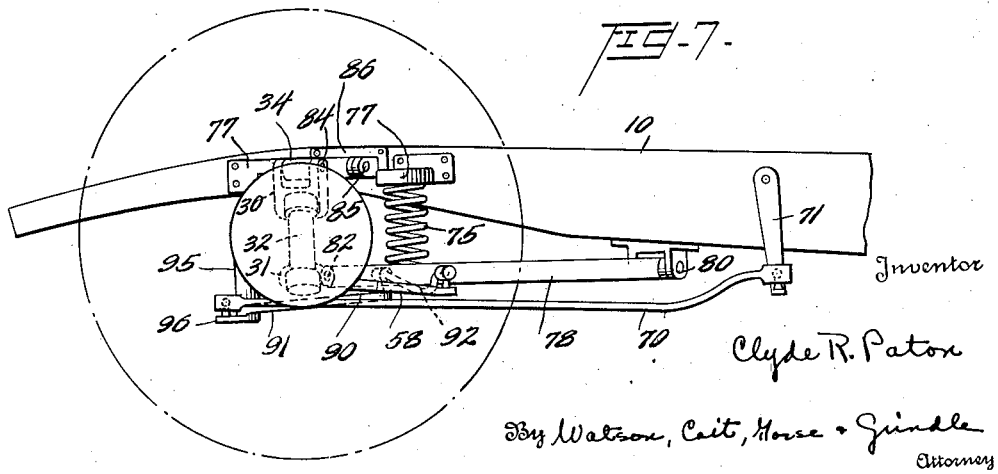

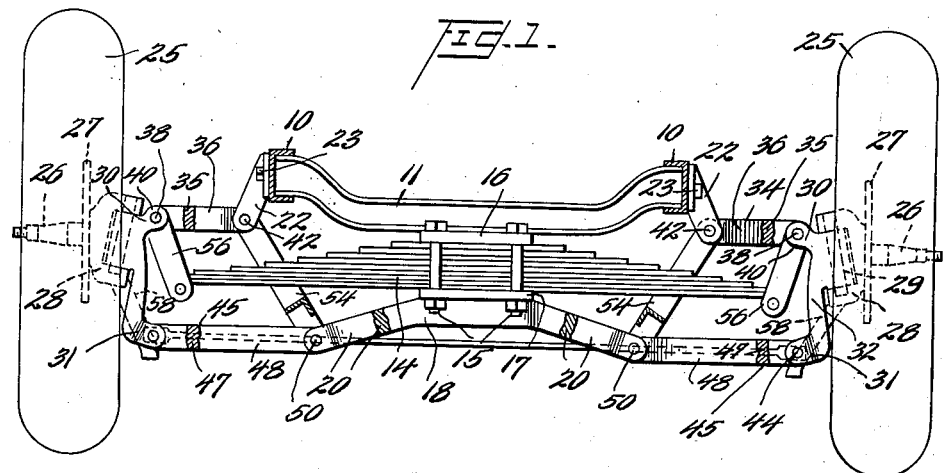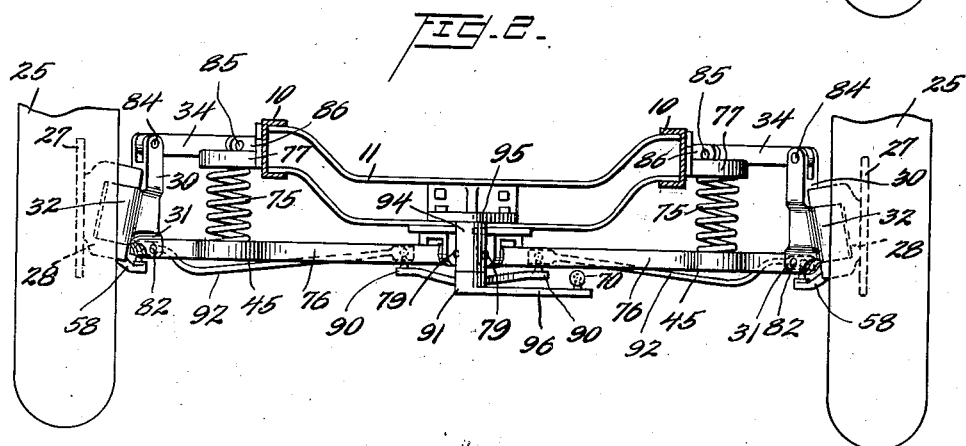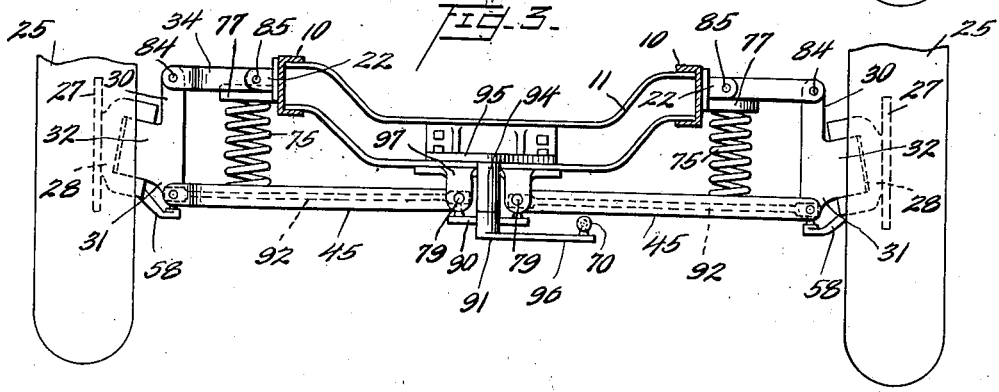

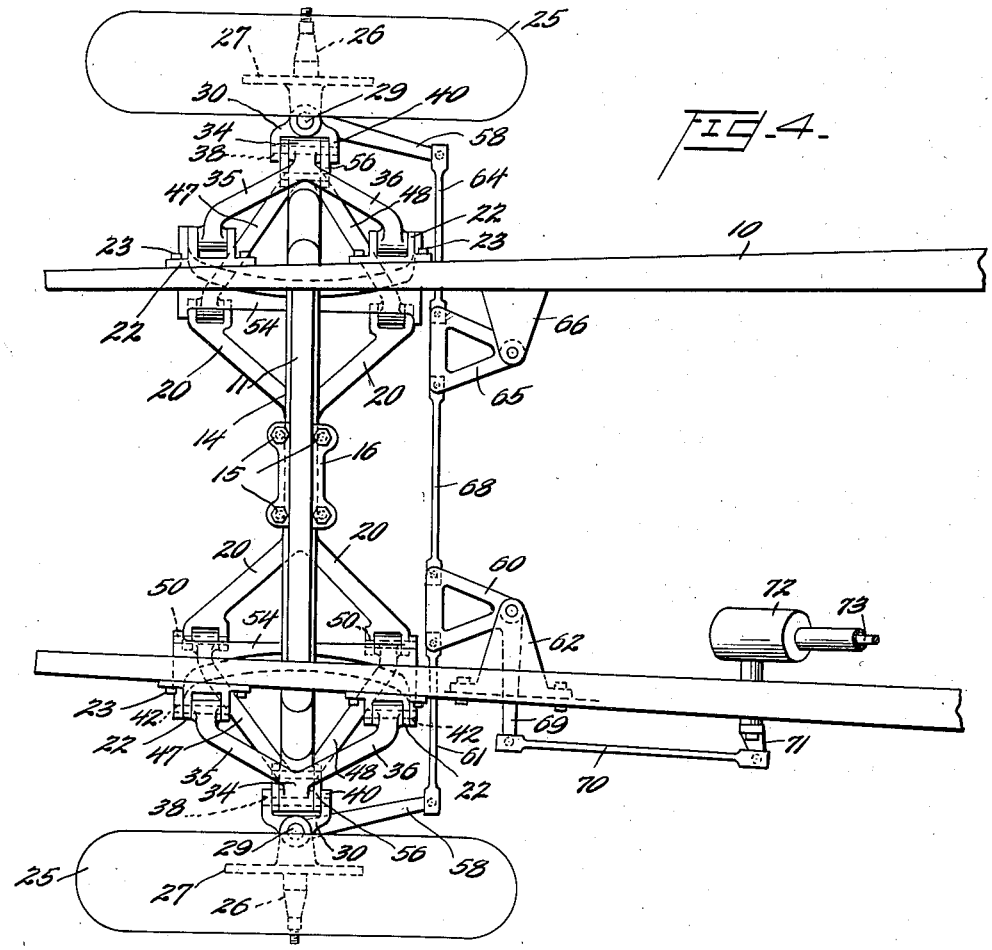
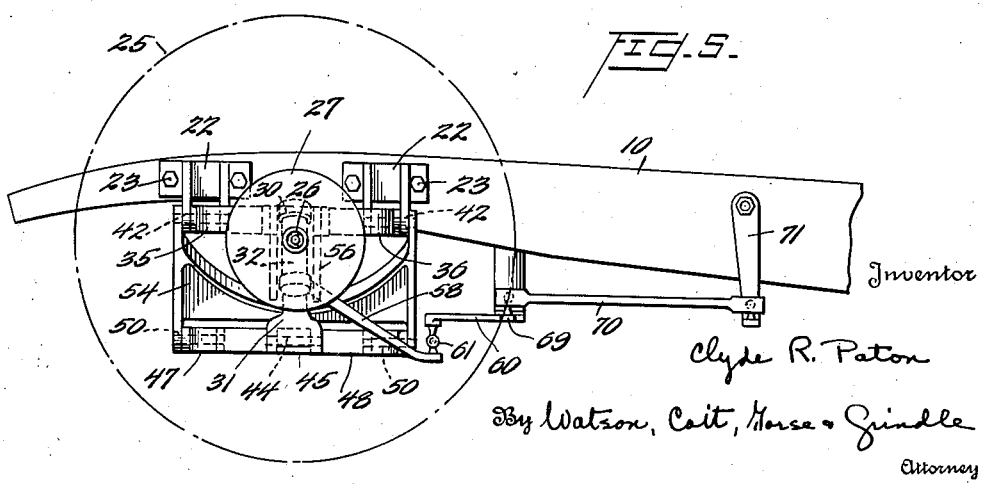

April 5, 1938.  C. R. PATON  2,113,094
MOTOR VEHICLE
Filed Dec. 7, 1933   5 Sheets-Sheet 4
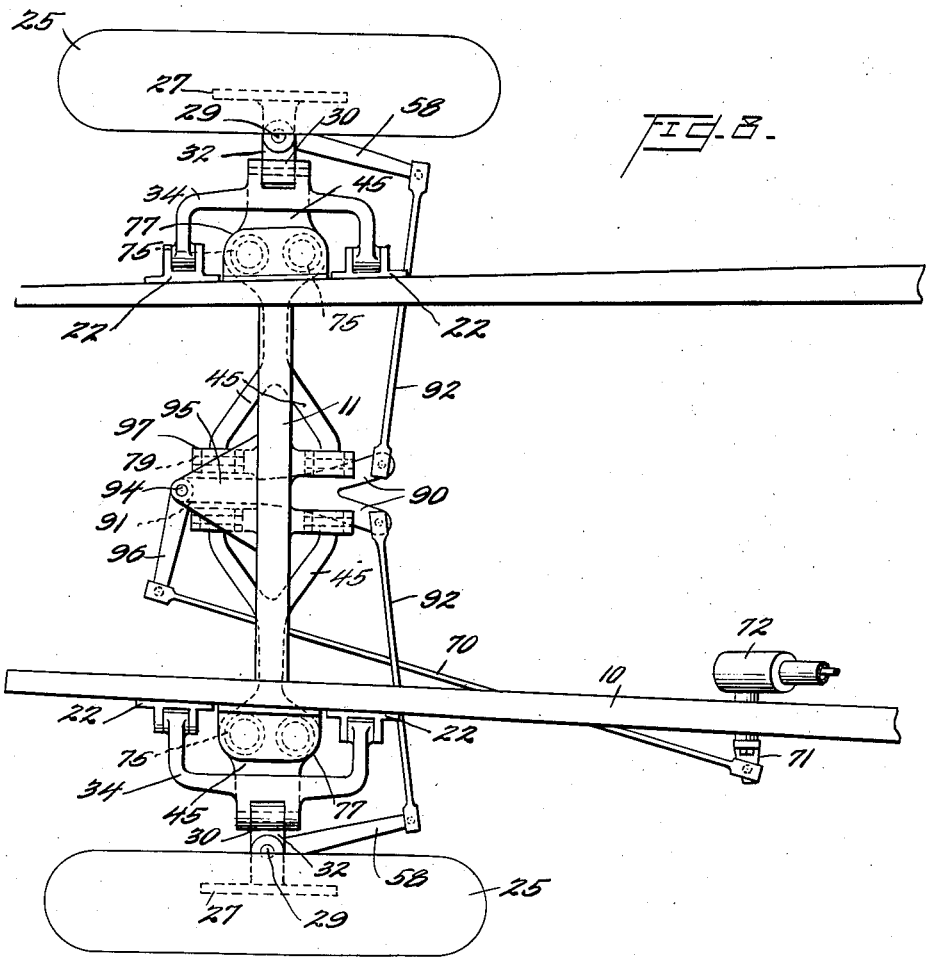
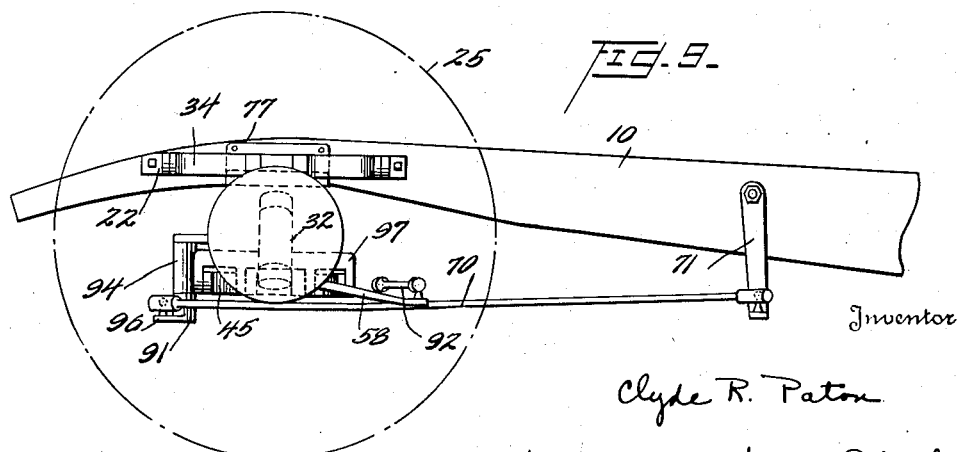
Inventor
Clyde R. Paton
By Watson, Coit, Morse & Grindle
Attorney April 5, 1938.  C. R. PATON  2,113,094
MOTOR VEHICLE
Filed Dec. 7, 1933  5 Sheets-Sheet 5
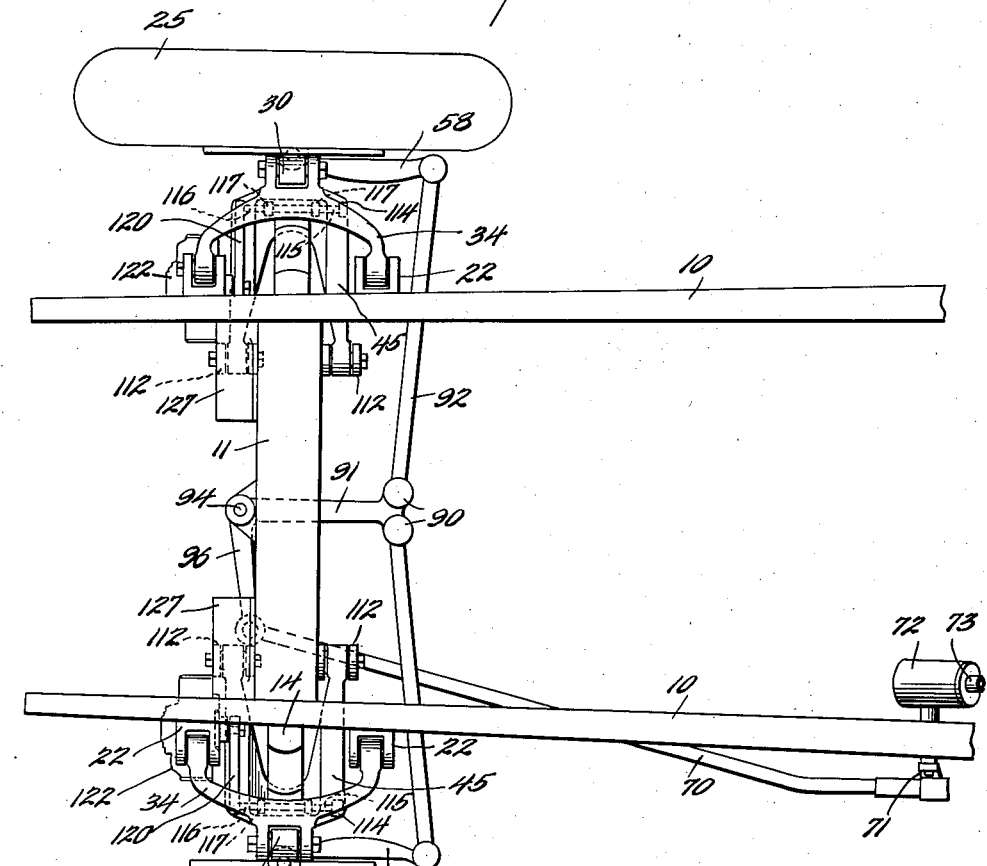
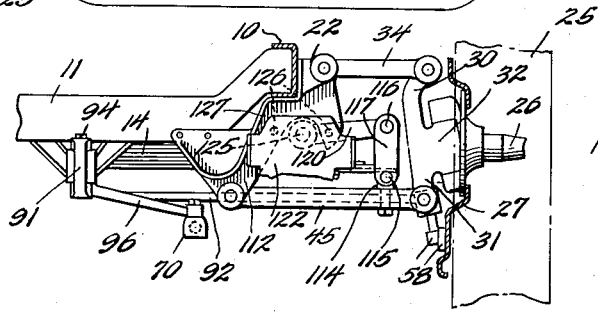
Inventor
Clyde R. Paton
By Watson, Cait, Morse & Windle
Attorney Patented Apr. 5, 1938

2,113,094

UNITED STATES PATENT OFFICE 2,113,094

MOTOR VEHICLE

Clyde R. Paton, Birmingham, Mich., assignor to Packard Motor Car Company, Detroit, Mich., a corporation of Michigan Application December 7, 1933, Serial No. 701,379

3 Claims. (Cl. 280—124)

This invention relates to motor vehicles of the type in which the road wheels are independently sprung from the vehicle frame and more particularly to the wheel suspension and steering mechanism associated with the steerable road wheels of this type of vehicle. It is the principal object of the invention to provide steering apparatus for the road wheels which is so constructed and arranged with respect to the wheel suspension for the steerable road wheels as to afford substantially perfect steering; in other words, the rising and falling movement of the road wheels in passing over an uneven road bed effects no improper displacement of the parts of the steering mechanism.

It is a feature of the invention that steering is effected by mechanism which includes a steering element having pivotal connection at its opposite ends with the road wheel assembly and with the vehicle frame, the arrangement being such that when this element is swung about its point of connection with the frame, it may describe an arc which conforms substantially to the arc executed, as the road wheel rises and falls, by that portion of the wheel assembly with which the element is associated.

A more specific object of the invention is the provision in a motor vehicle of independent means for supporting the respective steerable road wheels comprising a pair of links pivoted to each road wheel and to the vehicle frame about parallel substantially horizontal axes and steering mechanism for the wheel of which the points of connection between certain of the members rising and falling with the wheel are disposed in one or more of the axes of one of the links or are disposed substantially in the plane defined by the axes of one of the links.

Further objects and features of the invention will be apparent from the following description taken in connection with the accompanying drawings, in which Figures 1, 2, and 3 are front elevational views, partly in section, illustrating three different embodiments of the invention applied to the steerable road wheels of a vehicle;

Figures 4 and 5 are plan and side elevational views respectively of the form of the invention shown in Figure 1;

Figures 6 and 7 are plan and side elevational views respectively of the construction illustrated in Figure 2;

Figures 8 and 9 are plan and side elevations respectively of the modification disclosed in Figure 3; and Figures 10 and 11 are respectively a plan view and a front elevation partly in section of a further modification.

In describing the invention, reference will be made to the several embodiments thereof illustrated in the drawings and specific language will be employed to facilitate an understanding of the manner in which the invention is applied. It will nevertheless be understood that by describing the invention in detail it is not intended that the scope of the invention shall be thereby limited, various alterations and further modifications being contemplated such as would occur to one skilled in the art to which the invention relates.

Referring first to the form of the invention illustrated in Figures 1, 4, and 5, it will be observed that the conventional vehicle frame comprising side frame members 10 and a cross frame member 11 has been shown. The vehicle spring 14, which as illustrated is of the conventional leaf spring type, is secured at its mid point to the central portion of the cross frame member 11. For instance the spring may be clamped by means of bolts 15 between a bracket 16 carried by the cross frame member 11 and a plate 17, the latter being formed integrally with or secured to a member 18. The member 18 extends transversely of the vehicle and is forked at each outer end to form outwardly divergent arms 20, the outer ends of these arms serving as one point of support for the wheel suspension as will be hereinafter explained, the other point of support being afforded by brackets 22 which are spaced longitudinally of the vehicle and are secured to each of the side frame members as at 23. The road wheels 25 are carried by the usual wheel spindles 26 extending laterally from brake backing plates 27, the latter having secured thereto or formed integrally therewith steering knuckles 28 which are journalled for movement in a substantially horizontal plane about king pins 29, it being understood that the axis of these king pins may be inclined as is customary so as to substantially intersect the wheel tread at the point of contact with the road bed. Each king pin 29 is carried by a wheel supporting bracket 32 having formed integrally therewith upper and lower members 30 and 31, the bracket 32 being supported for rising and falling movement with the associated road wheel as will now be explained.

At each side of the vehicle an upper wheel supporting link 34 having inwardly divergent arms 35 and 36 is pivotally connected to the associated member 30; for instance, a bolt 38 may extend through ears 40 formed on the member 30 and through an aperture in the link 34. The arms 35 and 36 of the link 34 are pivoted as at 42 to the spaced brackets 22. Similarly, the member 31 is pivotally connected as at 44 to a lower wheel supporting link 45, the link 45 having inwardly divergent arms 47 and 48 which are pivoted as at 50 to the arms 20 of the member 18. In order to strengthen the construction a brace member 54 is connected between the outer ends of the arms 20 and the brackets 22, the pivotal supports for the inner ends of the links 34 and 35 affording a convenient means of connection to the brace member. Thus the brace member 54 forms a rigid strut between the members which serve to support the links.

The pivotal axes at the ends of the links 34 and 45 are parallel to each other and as shown in the drawings are substantially parallel to the longitudinal axis of the vehicle, although the latter is not an essential point since the axes may be inclined at an angle to the axis of the vehicle, for instance as in the form of the invention shown in Figure 2 of the drawings hereinafter described. Furthermore, as shown in the drawings, the pivotal axes at the opposite ends of each link lie in substantially the same horizontal plane, although this is similarly not essential. A link 56 serving as a shackle for the leaf spring 14 is connected in the conventional manner to each end of the latter and is pivoted to each of the members 30, the bolt 38 being employed for this purpose. In this manner the leaf spring is operatively associated with the wheel assembly to yieldingly resist rising and falling movements of the latter.

The operation of the wheel suspension as thus far described will now be apparent. On encountering an obstruction in the road or in passing over an irregular road surface, either road wheel 25 may swing upwardly, the associated members 30 and 31 being guided in this movement by the pivoted links 34 and 45. If these links were of the same length, a supporting parallelogram structure would be provided, and the unit comprising the members 29, 30, and 31 would pass through a series of positions parallel to the initial position regardless of the extent of upward movement of the wheel. Accordingly any point in the wheel assembly, including the wheel tread, would execute an arc about a corresponding inwardly disposed point and thus the wheel tread, on meeting an obstruction, would not only rise but would move inwardly with respect to the vehicle frame. This inward movement would result in rapid wear or scuffing of the tire, sometimes sufficiently severe to strip the rubber from the fabric. However, in the present construction employing a lower link of greater length, the vehicle wheel is not only moved bodily inward as it rises by reason of the parallel link arrangement, but because of the difference in the length of the links, the plane of the wheel is altered as the wheel rises, that portion of the wheel above the wheel spindle moving inwardly to a greater extent than the portion of the wheel below the wheel spindle. By suitable relative dimensioning of the links this inclination of the wheel as it rises serves to compensate for the inward displacement of the tread, and the point of contact of the tread with the ground will move through a substantially vertical path and scuffing of the tires such as would occur if the links were of equal length will accordingly be avoided.

Turning now to the mechanism for steering the road wheels, it will be observed that each steering knuckle 28 is provided with a rearwardly extending arm 58 which is rigidly secured thereto or formed integrally therewith. The steering knuckle arm 58 at the left-hand side of the vehicle is connected to a bell crank lever 60 by means of a rod 61 having articulated connection with the bell crank lever and the arm. The bell crank lever 60 may be supported on the side frame member 10 of the vehicle by means of a bracket 62. Similarly, the steering knuckle arm 58 at the right-hand side of the vehicle is connected by means of a rod 64 with a bell crank lever 65 carried by a bracket 66 secured to the associated side frame member 10 of the vehicle, the bell crank levers 60 and 65 being connected by means of a rod 68 having articulated connection with both bell crank levers. The bell crank lever 60 is provided with an outwardly directed arm 69 which is connected by means of a rod 70, commonly referred to as a steering drag link, with a steering drop arm 71, the latter being operable by steering gear within the housing 72 at the lower end of the steering column 73 in the conventional manner.

It will be observed that the point of connection between the rod 61 and the bell crank lever 60 lies in the axis 50 of the pivotal connection between the lower link 45 and the vehicle frame and that the point of connection between the rod 61 and the steering knuckle 58 lies in the axis of pivotal connection 44 between the lower link 45 and the wheel supporting member 31, the rod 61 being substantially parallel to the lower link 45. Similar disposition is made at the opposite side of the vehicle of the points of pivotal connection of the ends of the rod 64 and the axes for the corresponding lower link 45. By reason of this arrangement the rods 61 and 64 execute movements corresponding to the movement of the associated lower links 45 as either road wheel rises and falls, there being no tendency to impart movement to the road wheels about the axes of their respective king pins. Since these bell crank levers are fulcrumed on the frame, the remaining portions of the steering mechanism partake of no movement whatever as the road wheels rise and fall. Thus the transmission of road shock through the steering mechanism to the usual steering hand wheel is avoided and the tendency of the wheels to shimmy as the result of improper displacement of the component parts of the steering mechanism is eliminated.

Reference will now be made to the modification illustrated in Figures 2, 6, and 7 in which the principles of the invention are likewise applied, similar reference characters being employed to designate elements performing corresponding functions in the two forms of the invention. It will be observed that in the second form of the invention the use of the leaf spring is replaced by coil springs and the axes of the links which support and guide the wheel assembly are disposed at an acute angle with relation to the vertical plane containing the longitudinal axis of the vehicle. Thus each lower link 45 is formed to provide two arms 76 and 78, these arms being integrally formed or secured together for swinging movement about a common axis, the arm 76 being pivoted as at 79 to the cross frame member 11 and the arm 78 being pivoted as at 80 to the side frame member 10. At its outer end the link 45 is pivotally connected as at 82 to the lower member 31 of the wheel supporting bracket 32, the latter comprising with the king pin 29 a wheel carrying unit as hereinbefore explained. The upper link 34 is likewise pivotally connected as at 84 and 85 respectively to the upper member 30 of the bracket 32 and to a bracket 86 secured to the side frame member 10. Since the axes of pivotal connection of the links 34 and 45 are all parallel, the wheel assembly will be supported for rising and falling movement as in the preceding embodiment of the invention. The inclined disposition of the axes, however, offers certain advantages since when either road wheel meets an obstruction and rises it will be permitted to yield slightly to the obstruction by reason of the fact that the wheel is guided by the supporting links in a path having a component of movement directed rearwardly of the vehicle and the shock of the impact is thereby lessened to some extent.

Rising and falling movements of the road wheel assemblies are yieldingly resisted by coil springs 75, two such springs being associated with each of the lower supporting links 45 and being interposed between these links and brackets 77 carried by the side frame 10 of the vehicle. By employing coil springs rather than leaf springs static friction may be substantially eliminated whereby easier riding is assured. Furthermore, by the employment of two or more coil springs it is possible to use springs of relatively low frequency and at the same time ensure adequate strength to support the load of the vehicle. Thus oscillations of the vehicle body are not executed at the rapid and therefore annoying frequency ordinarily prevailing where high rate springs such as the usual leaf spring are employed.

It will be seen that with this construction the tendency of the road wheel supporting means to twist about an axis transverse of the vehicle when the brakes are applied is adequately resisted by the arm 78 of the link 45, this arm constituting in effect a torque arm. Furthermore, this tendency of the supporting structure to twist may be utilized to resist dipping of the front end of the vehicle. Thus on application of the vehicle brakes the entire wheel suspension tends to rotate about the point of contact of the road wheel with the road surface in a counterclockwise direction as viewed in Figure 7, and an upwardly acting force is applied to the torque arms 78 which is transmitted at the rearward end of these arms to the side frame members 10. The upward thrust thereby imparted to the frame counteracts partially or wholly the usual depression of the front end of the vehicle as the vehicle is retarded or stopped.

As in the first described embodiment of the invention, each steering knuckle 28 is provided with a rearwardly extending arm 58, and the arms 58 are connected to the two arms 90 of a bell crank lever 91 by means of rods 92 having articulated connection with the arms 58 and 90. The bell crank lever 91 is pivoted as at 94 for swinging movement about a substantially vertical axis on a bracket 95 secured to and depending from the cross frame member 11. The bell crank lever 91 is also provided with a third arm 96 which is connected through a steering drag link 70 to a steering drop arm 71, the latter being manipulated by gearing located within the usual steering housing 72, the drag link 70 being pivotally connected to the arms 96 and 71. The gearing in the housing 72 is so constructed as to impart movement in the proper direction to the arm 71 on operation of the usual steering handwheel.

It will be observed that each rod 92 is pivotally connected to the adjacent arm 90 of the bell crank lever 91 at a point lying in the axis 79 about which the lower link 45 supporting the associated wheel assembly swings, and that the point of pivotal connection between each rod 92 and the adjacent arm 58 is disposed substantially in the plane defined by the link 45 and is located adjacent the axis of pivotal connection 82 between the link 45 and the supporting member 31 of the wheel assembly. Thus with this construction as with the form of the invention previously described, either rod 92 may rock about the point of pivotal connection thereof with the bell crank lever 91 in response to rising and falling movement of the road wheels without appreciable relative displacement of the members to which it is connected.

In the form of the invention shown in Figures 3, 8, and 9 of the drawings, the wheel suspension employed does not differ materially from that shown in Figure 1 of the drawings, the points of pivotal connection of the supporting links 34 and 45 to the road wheel assembly and to the frame respectively being parallel to each other and to the longitudinal axis of the vehicle. However, the leaf spring employed in the first described form of the invention is replaced by coil springs 75 as in the form of the invention shown in Figure 2, these coil springs acting between the lower link 45 and a bracket 77 secured to the side frame member 10 of the vehicle. Brackets 22 and 97 secured to the frame serve as fulcrums for the inner ends of the supporting links 34 and 45 respectively.

The steering mechanism employed with this form of the invention is similar to that disclosed in Figures 2, 6, and 7 of the drawings, the centrally disposed bell crank lever 91 having arms 90 connected to the steering knuckle arms 58 by rods 92, each rod 92 being pivotally connected to the associated arms 58 and 90. The point of connection of each rod 92 to the adjacent arm 90 of the bell crank lever 91 is disposed in the axis of pivotal connection of the lower link 45 with the bracket 97 carried on the vehicle frame, and the points of connection of the rods 92 to the arms 58 are located in the axes of pivotal connection of the links 45 and the members 31 of the vehicle wheel assemblies. The bell crank lever 91 is provided with a third arm 96 which is connected by means of a steering drag link 70 to the steering arm 71 as in the previously described forms of the invention.

It will be appreciated that in the form of the invention just described as in the other forms, the rods 92 are disposed in the planes of the associated lower supporting links 45 and thus execute a movement similar to that executed by the lower links as the road wheels rise and fall. In this form of the invention the steering geometry is perfect owing to the exact alignment of the points of pivotal connection of the rods 92 and the associated links 45 and the parallel disposition of each rod and the associated link, the remaining members of the steering mechanism being carried by the vehicle frame and therefore being unaffected by vertical displacement of the road wheels.

The wheel suspension embodied in the modification shown in Figures 10 and 11 does not differ materially from that illustrated in Figures 1, 4, and 5, and similar reference characters are employed to designate elements having corresponding functions. Thus in Figures 10 and 11 each road wheel 25 is carried on the usual wheel spindle 26, the latter being in turn supported by a steering knuckle 27 journaled for steering movement in a substantially horizontal plane on a wheel supporting bracket 32. Pivoted links 34 and 45 support the bracket 32 for rising and falling movement, the upper link 34 being pivotally connected at its inner end to a supporting bracket 22 and the lower link 45 being pivotally connected to a bracket 112 which is similarly secured to the frame and which, as illustrated in the drawings, may be formed integrally with bracket 22.

A transversely extending leaf spring 14 carried by the cross frame member 11 is associated with the supporting linkage for each road wheel to yieldingly resist upward movement of the road wheel assembly, and is preferably connected to each of the lower links. Thus elements 114, extending through and secured to each lower link 45, carry a rod 115 on which the adjacent outer end of the leaf spring 14 rests. Links 117 constituting a shackle member are pivotally connected to the rod 115 and to a rod 116, the latter being carried by the laterally extending arm 120 of a shock absorbing device located within a housing 122. The arm 120 is secured to a shaft 125 which extends within the housing 122 and which actuates the conventional shock absorber piston, the function of which is well understood, the housing 122 being conveniently secured as at 126 to a web 127 formed integrally with the brackets 22 and 112.

It will be appreciated that as the wheel assembly rises and falls, the shock absorber arm 120 will be rocked through the connecting links 117 and will resist any sudden or accelerative displacement of the road wheel.

Each road wheel assembly is steered by means of an arm 58 which is secured to the usual brake backing plate 27, the arms 58 having an articulated connection with the arms 90 of a centrally disposed bell crank lever 91 through tie rods 92, the bell crank lever being supported for pivotal movement on the cross frame member 11 as at 94. The bell crank lever 91 is provided with a third arm 96 which is connected with the usual steering drop arm 71 by means of a steering link 70 having pivotal connection with the two arms.

It will be observed from an inspection of Figure 11 that the rods 92 are disposed in the planes of the associated lower wheel supporting links 45, the rearward ends of the arms 58 being located substantially in the axes of pivotal connection of the links 45 with the respective wheel supporting brackets 32. Thus, as the road wheels rise and fall, the corresponding rods 92 will swing about their points of pivotal connection with the arms 90 of the bell crank lever 91. By reason of the disposition of the rods 92 substantially in the plane of the respective links 45, the outer end of each rod 92 in swinging about the point of pivotal connection thereof with the bell crank lever 91 will describe an arc conforming substantially to the arc executed by the rearward end of the associated arm 58 as the road wheel rises and falls, and thus any unintentional displacement of the several elements of the steering mechanism and consequently of the road wheels is reduced to a minimum.

Having thus described the invention, what is claimed as new and desired to be secured by Letters Patent is:

1. In a motor vehicle wheel suspension, the combination with a vehicle frame, of steerable road wheels disposed at opposite sides of the frame, and devices for supporting said wheels on said frame for independent rising and falling movement with respect thereto, the device associated with each wheel comprising a wheel carrying member on which the wheel is supported for steering movement, a pair of links pivotally connected to said member and said frame for relative movement about parallel, substantially horizontal axes, one of said links being disposed above the other, and steering mechanism connecting said wheels for conjoint steering movement, said steering mechanism including a lever pivotally supported on said frame, arms carried by said wheel carrying members, and rods having articulated connections with said arms and said lever, the articulated connections for each of said rods lying substantially in the said pivotal axes of one of the links of the associated pair of links.

2. In a motor vehicle wheel suspension, the combination with a vehicle frame, of steerable road wheels disposed at opposite sides of the frame and devices for supporting said wheels on said frame for independent rising and falling movement with respect thereto, the device associated with each wheel comprising a wheel carrying member on which the wheel is supported for steering movement, a pair of links pivotally connected to said member and said frame for relative movement about parallel, substantially horizontal axes, one of said links being disposed above the other, and steering mechanism connecting said wheels for conjoint steering movement, said steering mechanism including a separate lever pivotally supported on each side of said frame, a tie rod connecting said levers, arms carried by said wheel carrying members, and rods having articulated connections with each of said arms and each of said levers, the articulated connections for each of said rods lying substantially in the said pivotal axes of one of the links of the associated pair of links.

3. In a motor vehicle wheel suspension, the combination with a vehicle frame, of steerable road wheels disposed at opposite sides of the frame, and devices for supporting said wheels on said frame for independent rising and falling movement with respect thereto, the device associated with each wheel comprising a wheel carrying member on which the wheel is supported for steering movement, a pair of links pivotally connected to said member and said frame for relative movement about parallel, substantially horizontal axes, one of said links being disposed above the other, and steering mechanism connecting said wheels for conjoint steering movement, said steering mechanism including lever means pivotally supported on said frame, arms carried by said wheel carrying members, and rods having articulated connections with said arms and said lever means, the articulated connections for each of said rods lying substantially in the said pivotal axes of one of the links of the associated pair of links.

CLYDE R. PATON.